United States Patent

Schulte et al.

Patent Number: 5,414,784
Date of Patent: May 9, 1995

[54] ROLLER BEARING ASSEMBLY

[75] Inventors: Günther Schulte, Volkertshausen, Germany; Fritz Mahnig, Schaffhausen, Switzerland

[73] Assignee: Georg Fischer Automobilguss GmbH, Singen, Germany

[21] Appl. No.: 114,418

[22] Filed: Aug. 30, 1993

[30] Foreign Application Priority Data

Sep. 9, 1992 [CH] Switzerland ............ 02843/92

[51] Int. Cl.$^6$ ............................................. F16C 43/04
[52] U.S. Cl. ..................................... 384/537; 384/539
[58] Field of Search ............... 384/510, 535, 537, 539, 384/559, 581, 584, 585

[56] References Cited

U.S. PATENT DOCUMENTS

| | | | |
|---|---|---|---|
| 3,797,900 | 3/1974 | Secola | 384/539 |
| 3,897,988 | 8/1975 | Dickinson et al. | 384/537 X |
| 4,125,298 | 11/1978 | Heurich et al. | 384/537 |
| 4,848,938 | 7/1989 | Haas et al. | 384/537 |
| 5,061,090 | 10/1991 | Kriaski et al. | 384/585 X |

FOREIGN PATENT DOCUMENTS 40282  6/1929  Denmark ............ 384/585

Primary Examiner—Thomas R. Hannon
Attorney, Agent, or Firm—Bachman & LaPointe

[57] ABSTRACT

An axial retention 4 of a roller bearing 1 in a support part 2 comprises a stop shoulder 7, disposed at an elastically or flexurally widenable portion 6 of the support part 2. When the roller bearing is pressed into the support part 2, the portion 6 widens. After the roller bearing has been pushed up to the shoulder 3, a reverse or return deformation of the portion 6 occurs, so that the stop shoulder 7 forms the axial retention 4 for the roller bearing 1.

4 Claims, 1 Drawing Sheet

ROLLER BEARING ASSEMBLY

FIELD OF THE INVENTION

The present invention deals with a roller bearing assembly.

BACKGROUND OF THE INVENTION

Axial retentions, such as flanges attached by bolts with lock washers or straining rings (so-called Seeger circlips) for roller bearings are generally very expensive to manufacture and install and require also additional detachable parts.

It is therefore an object of the present invention to create an axial retention assembly for roller bearings, which can be simply manufactured and is suitable for carrying axial forces at the outer and/or inner ring or race of the bearing, without the use of additional parts, wherein a simple and rapid installation of the rolling bearing must be assured.

SUMMARY OF THE INVENTION

These and other aspects of the invention, which shall become hereafter apparent, are achieved by an axial retention of a roller bearing in a support part, comprising a stop shoulder disposed at an elastically or flexurally widenable portion of the support part. When the roller bearing is pressed into the support part, the portion widens, wherein after the roller bearing has been pushed up to the shoulder, a reverse or return deformation of the portion occurs, so that the stop shoulder forms the axial retention for the roller bearing.

BRIEF DESCRIPTION OF THE DRAWING

The invention will be better understood by the Detailed Description of the Preferred Embodiments, when read in connection with the following drawing.

DETAILED DESCRIPTION OF THE PREFERRED EMBODIMENTS

Figure 1:
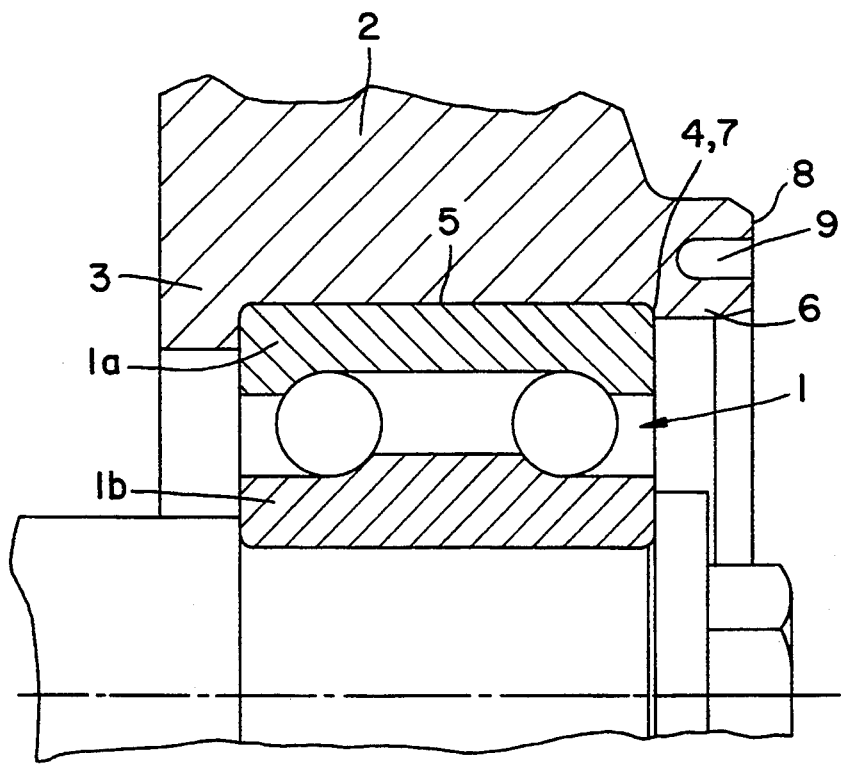
FIG. 1 is a cross-sectional view through a first embodiment of a roller bearing assembly according to the present invention.

Referring now to the drawing, FIG. 1 depicts a roller bearing 1 in a support part 2. An outer race 1a of the bearing is supported at a shoulder 3 of the support part 2. At its outer side, the external race 1a is retained against axial displacement by a stop shoulder 7, on a portion 6 of the support part 2 following upon the bearing seat 5. The internal diameter B of the portion 6 is slightly smaller than the diameter A of the bearing seat 5, in such a way that the portion 6 is deformed in a flexural or elastic manner when the bearing 1 or its outer race 1a is pressed in. When the bearing 1 or its external race 1a is pressed up to the shoulder 3, the portion 6 of the support part 2 returns to the original diameter, with the stop shoulder 7 preventing axial displacement of the bearing 1.

In order to assist the elastic or flexural deformability, an annularly shaped recess can be disposed preferably on the end face 8 of the portion 6 of the support part 2. The recess is configured in cross-section, for instance, elongated with an internal rounding or radius or is shaped semicircularly.

Figure 2:
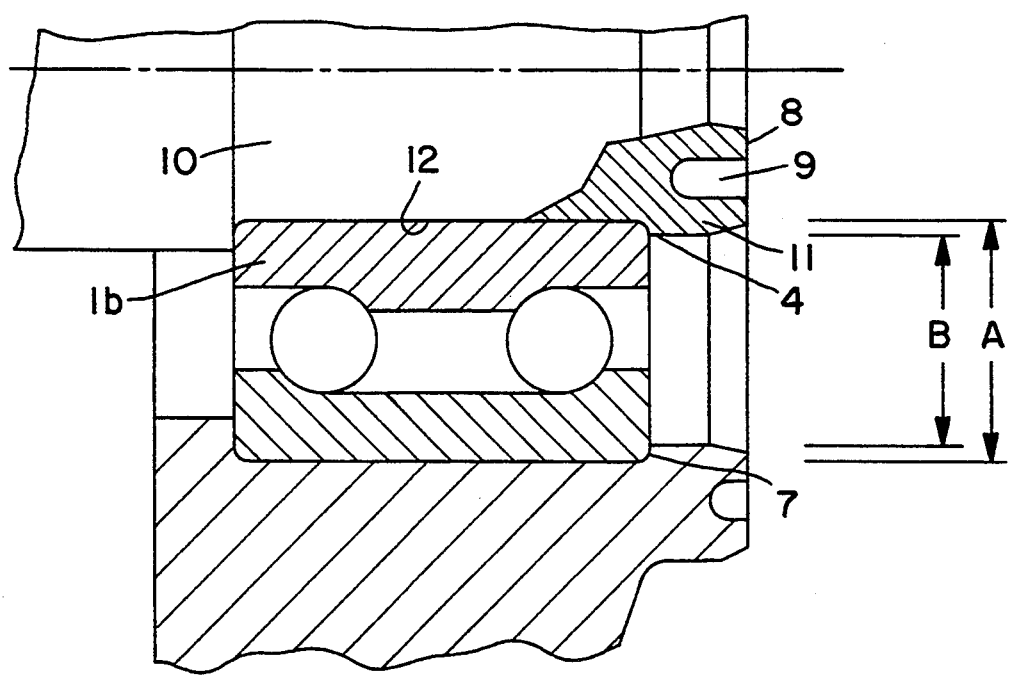
FIG. 2 is a cross-sectional view through a second embodiment of a roller bearing assembly according to the present invention.

A corresponding axial retention 4 of the inner race 1b of a roller bearing 1 on a support part 10, designed as a shaft or a bolt, is effected in the same way. (See FIG. 2). The portion 11 of the support part 10 is slightly larger in external diameter than the diameter of the bearing seat 12 of the inner race 1b.

An annularly shaped recess 9 for improved elastic deformation can also be placed on the end face 8 of the portion 11 of the support part 10.

The axial retention of the roller bearing described above affords the advantage of a simple automatic installation of the roller bearing since no additional parts have to be installed. There results an advantageous application for the described arrangement of a roller bearing, for instance, with pivot bearings, axis trunnion bearings and wheel hubs in the series assembly in the automobile industry.

Herein the support parts 2, 10 are preferably manufactured as cast parts from cellular graphite iron or light metal. The described axial retention can also be used with otherwise designed support or bearing parts of steel or other metals.

While the preferred embodiment of the invention has been depicted in detail, modifications and adaptations may be made thereto without departing from the spirit and scope of the invention as delineated in the following claims.

What is claimed is:

1. A bearing assembly, comprising:
   a bearing having an inner race and an outer race having opposite end faces; and
   a support part for supporting the outer race of the bearing;
   wherein the support part includes (1) a bearing seat having a diameter A for receiving the outer race and having an inner shoulder for engaging one of the opposite end faces of the outer race and (2) an outer deformable portion of diameter B smaller than diameter A having a shoulder for engaging another of the opposite end faces of the outer race thereby to retain the bearing against axial displacement wherein the deformable portion is deformed by the outer race only during insertion of the bearing onto the bearing seat.

2. The bearing assembly of claim 1, further comprising an annularly-shaped recess, placed at an end face of a portion of the support part defining the outer deformable shoulder, to facilitate deformation of said shoulder upon mounting the outer race in the bearing seat.

3. The bearing assembly of claim 2, wherein the recess has one of a semicircularly-shaped cross-section and an elongated cross-section.

4. The bearing assembly of the claim 3, wherein the support part is a cast part from one of spherulitic graphite iron and light metal.

* * * * *